United States Patent [19]

Klinkicht

[11] 4,108,298
[45] Aug. 22, 1978

[54] SIEVE STRINGER BELT FOR CONVEYORS

[76] Inventor: Helmut Klinkicht, Bahnhofstrasse 12, 2000 Barsbuttel, Fed. Rep. of Germany

[21] Appl. No.: 689,243

[22] Filed: May 24, 1976

[51] Int. Cl.² ............................................... B65G 17/00
[52] U.S. Cl. ...................................... 198/834; 198/844
[58] Field of Search ............... 198/834, 844, 848, 849, 198/850, 851, 853

[56] References Cited

U.S. PATENT DOCUMENTS

| | | | |
|---|---|---|---|
| 2,912,098 | 11/1959 | Manes et al. | 198/849 |
| 3,015,381 | 1/1962 | Mohwinkel et al. | 198/844 |

FOREIGN PATENT DOCUMENTS

| | | | |
|---|---|---|---|
| 516,877 | 11/1954 | Belgium | 198/848 |
| 1,125,840 | 3/1962 | Fed. Rep. of Germany | 198/844 |
| 1,178,360 | 9/1964 | Fed. Rep. of Germany | 198/848 |

Primary Examiner—Evon C. Blunk
Assistant Examiner—Jeffrey V. Nase
Attorney, Agent, or Firm—Max Fogiel

[57] ABSTRACT

An arrangement for belt conveyors, particularly for conveyors of substantially large width, in which lateral belts having reinforcing inserts, are spaced from each other along the width of the conveyor. The belts may be of rubber or synthetic type of material. Between the lateral belts, a supporting spacer belt is provided. At least one of the belts is a drive belt engaging a drive wheel with a surface shaped in the form of a tooth-rack or gear rack. Transverse elongated elements are connected to the lateral belts, and are supported by the intermediate supporting belt. One set of transverse elements are straight-lined along their longitudinal axes, whereas a second set of transverse elements are offset with respect to their ends of support, and are spaced from the first set. The transverse elements pass through openings in the supporting intermediate belt, which are in a staggered array.

7 Claims, 6 Drawing Figures

SIEVE STRINGER BELT FOR CONVEYORS

BACKGROUND OF THE INVENTION

The present invention relates to a sieve stringer belt for conveyors, particularly for conveyors of large width where the belts are reinforced rubber or synthetic belts into which sieve stringers ae inserted.

In the course of increasing the efficiency in agriculture, the machines used are growing progressively larger. This affects particularly conveyors since conventional conveyors are not sufficiently wide. Attempts have been made to meet the new requirements by placing two or more conveyors next to each other in order to obtain a larger area. However, the erection and placement of several conveyors next to each other has proven inadequate and uneconomical because the maintenance of the conveyors requires more labor and several trouble and hazard sources are provided by the multiple drive.

It is, therefore, an object of the present invention to provide sieve stringer belts for large-width conveyors, where the sieve stringers are formed so that they have pocket-shaped depressions and to have the drive so efficient that the inadequacies present when having several individual conveyors next to each other are avoided.

SUMMARY OF THE INVENTION

The objects of the present invention are achieved by providing that between the lateral belts one or several support or spacer belts are located. At least one of these is a drive belt and the side facing the drive wheel is in the form of a toothed rack.

As a result of this construction, the relatively long sieve stringers are held by belts rotating with the side belts.

Since it was found with previously known belts that with too narrow change of direction of the sieve stringer, belt breaks in the reinforcement inserts could not be eliminated, in accordance with another improvement of the present invention, there is provided between the successive teeth of the middle drive belt in the transverse direction, a gap which restricts the amount of change of direction; as a result, the reinforcement inserts are not stressed unduly and over-straining of the belt is avoided.

It has been found advantageous to have the teeth of the toothed rack side of the middle drive belt constructed as double teeth. If only straight sieve stringers are used, the lateral belts are made corresponding to the middle belt; this results in a reduction in the number of parts and more economic manufacture.

In accordance to another improvement of the invention, the sieve stringers are fastened by mounting synthetic or metal pot-like sleeves on the ends of the sieve stringers and then inserting the stringers (rods) with these pot-like sleeves into the lateral belts. This construction has proven very advantageous because now the sieve stringers are located inside the bores or holes of the lateral belts and are protected against wear. Another advantage is that the pot-like sleeves are attached to the ends of the stringers before the sieve stringers are inserted into the lateral belts of the sieve stringer belt so that installation of the sieve stringers, especially when replacing them, is simplified considerably because the outward directed flanges provided at the open ends of the pot-like sleeves, ensure the spacing between the lateral belts.

A considerably simplification in the manufacture of the pot-like sleeve can be had by providing that the side walls consist of individual rods which are connected at their one end to a disk and at their other end to a ring or suitable perforated disk as flange.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
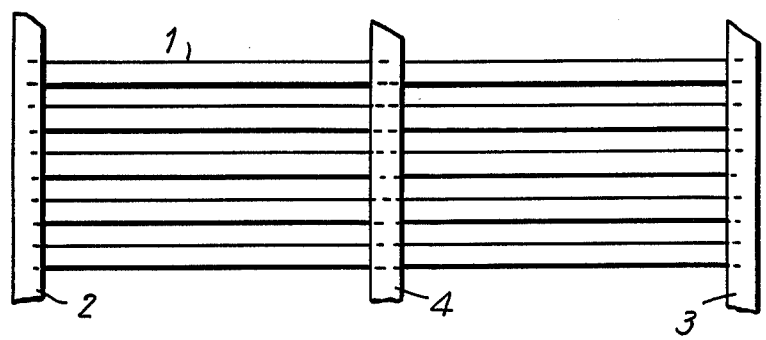
FIG. 1 is a top view on a partial section of a sieve stringer belt for conveyors of large width.
Figure 2:
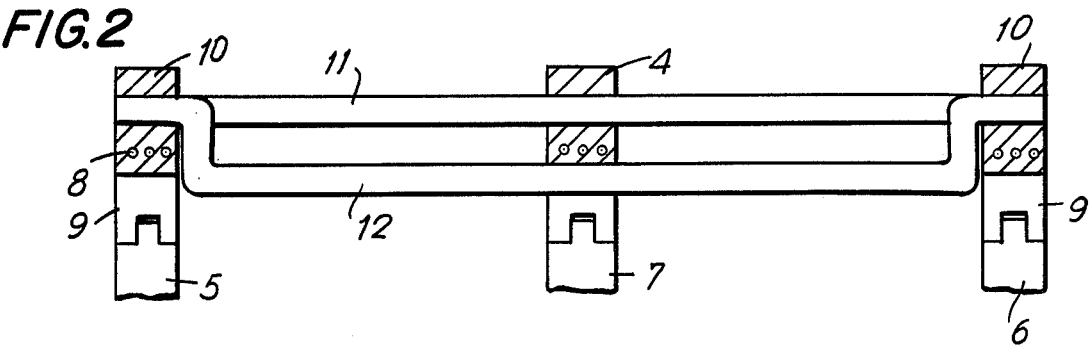
FIG. 2 is a schematic side view of an alternating arrangement of the sieve stringers.

Referring to FIG. 1, the sieve stringer belt 1 shown in cross-section comprises the two lateral drive belts 2 and 3 and a belt 4 which is located between these lateral drive belts 2 and 3; in this embodiment this belt 4 is also a drive belt.

Belts 2, 3 and 4, on those sides which face the driving wheels (pinions) 5, 6 and 7, have the form of a toothed rack and are strengthened by inserts 8. On the sides facing the teeth 9 of the toothed rack, the side belts 2 and 3 have projections 10 with a passage hole for the sieve stringers 11 and 12. Of the sieve stringers 11 and 12 inserted into the lateral belts 2 and 3, the sieve stringers 11 are straight and the sieve stringers 12 are offset on both sides by the same amount, so that pocket-like depressions are obtained in the sieve stringer belt. In order to ensure the pocket-like depressions, belt 4, which is located between lateral belts 2 and 3 in various horizontal planes, depending on the offset of sieve stringers 12, is provided with passage holes 13 for the straight stringers (rods) and passage holes 14 for the offset sieve stringers 12. The pocket-like depressions can be achieved by the exclusive use of straight sieve stringers 11 when the lateral belts 2 and 3 are made similar to the middle belt.

In designing the middle belt 4 as drive belt, cogs 15 are made part of the side facing the drive wheel. These cogs may be double teeth. Between two successive cogs 15 in the lengthwise direction, there is provided a notch 16 whose width limits the deflection (change of direction) of the sieve stringer belt.

Figure 3:
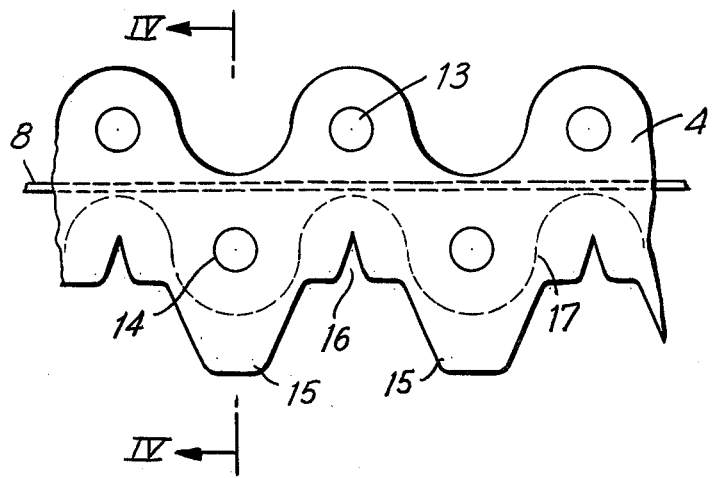
FIG. 3 is the side view of a middle belt.
Figure 4:
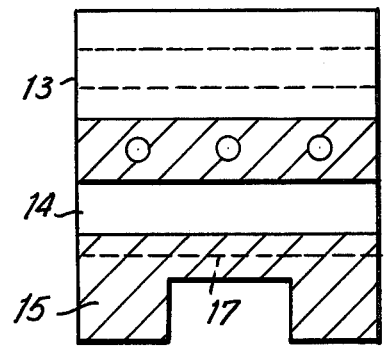
FIG. 4 shows a section taken along line IV—IV of FIG. 3.

The outline 17, shown in dashform, may be applied to show that the holes 14 are staggered with respect to the holes 13, so that a surface is generated similar to the upper surface and formed of successive convex and concave surfaces displaced from the upper respective surfaces shown in FIG. 3.

Figure 5:
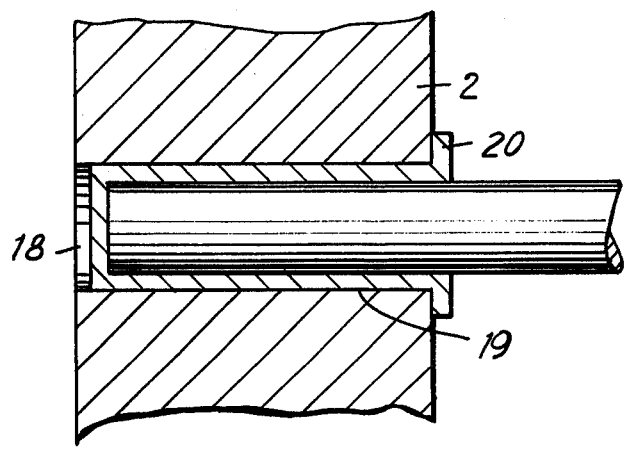
FIG. 5 shows a section taken through a side belt with a pot-like sleeve placed on a sieve stringer.

In the embodiment according to FIG. 5, there is provided in the lateral belt 2 of the sieve stringer belt, a continuous through hole or a blind hole 18 for accommodating a sieve stringer. The ends of this sieve stringer mount pot-like sleeves 19 which at their open end have an outward-directed flange 20 which contacts the inside of lateral belt 2. This flange 20 ensures maintaining the spacing between the lateral belts.

The pot-like sleeve may be made of synthetic material or metal.

Figure 6:
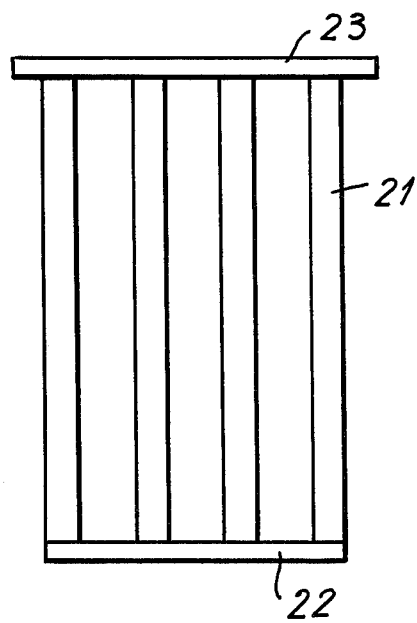
FIG. 6 is another embodiment of a pot-like sleeve.

In the embodiment of FIG. 6, the side wall of the pot-like sleeve 19 is made up of individual rods 21 which at their one end are connected to a disk 22, and at their other end to a ring 23 projecting beyond the periphery of the robs 21 or a corresponding perforated disk. This construction is comparable to the well-known cage of roller bearings.

Since the length of sleeve 19 is somewhat shorter than the width of lateral belt 2, this sleeve is located inside the belt and is protected against wear.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A belt conveyor arrangement, particularly for conveyors of substantially large width comprising, in combination, lateral belts with reinforcing insert means and spaced from each other along the width of the conveyor; at least one supporting belt between said lateral belts, at least one of said belts being a drive belt and having a driving surface, a drive wheel engaging said driving surface for driving said drive belt, said driving surface facing said drive wheel and having a toothed-rack shape; transverse elements connected to said lateral belts and supported by said supporting belt; pot-shaped sleeves mounted on the ends of said transverse elements and inserted into said lateral belts, said sleeves being seated in said lateral belts and carrying said transverse element; said sleeves comprising a disc at one end; a ring-shaped member at the other end; and individual rods connected between said disc and said ring-shaped member, the external diameter of said disc being substantially larger than that of the remaining portion of said sleeve.

2. The belt arrangement as defined in claim 1 wherein said supporting belt has a transverse notch between two adjacent tooth projections for restricting the deflection thereof.

3. The belt arrangement as defined in claim 1 wherein said toothed-rack shape surface comprises a toothed rack with double teeth.

4. The belt arrangement as defined in claim 1 wherein said transverse elements are straight-lined elements, said lateral belts being substantially similar to said supporting belt for carrying said transverse elements.

5. The belt arrangement as defined in claim 1 wherein said sleeves have an outwad-directed flange at open ends facing each other.

6. The belt arrangement as defined in claim 1 wherein said belts are comprised of rubber means and said sleeves are comprised of metal.

7. The belt arrangement as defined in claim 1 wherein said belts and said sleeves are comprised of synthetic material.

* * * * *